United States Patent
Hetherington et al.

[11] 3,837,202
[45] Sept. 24, 1974

[54] ROTARY ULTRASONIC TESTING APPARATUS

[75] Inventors: Matthew James Hetherington, Carlton Park near Market Harborough; Peter Atkinson, Stanion, near Kettering, both of England

[73] Assignee: British Steel Corporation, London, England

[22] Filed: Mar. 6, 1973

[21] Appl. No.: 338,635

[30] Foreign Application Priority Data
Mar. 9, 1972    Great Britain .................... 11085/72

[52] U.S. Cl. ............................ 73/71.5 U, 73/67.8 S
[51] Int. Cl. ........................................... G01n 29/04
[58] Field of Search ........ 73/67.8 S, 71.5 U; 324/37

[56] References Cited
UNITED STATES PATENTS
3,281,667  10/1966  Dobbins et al. ...................... 324/40
3,350,925  11/1967  Coy ................................. 73/67.8 S

*Primary Examiner*—Charles A. Ruehl
*Attorney, Agent, or Firm*—Bacon & Thomas

[57] ABSTRACT

A probe unit for use in rotary ultrasonic testing apparatus which includes a tube engaging probe pad carrying at least one ultrasonic testing transducer probe, in which the probe pad is mounted at one end of an arm provided with a counter-weighting mass at the other end thereof. The unit also includes a member rotatable about an axis substantially coincident in use with that of the tube to be tested, and the arm, which is inclined relative to the axis of rotation, is pivotally connected intermediate its ends to the rotatable member for pivotal movement of the pad towards and away from the axis of rotation, whereby upon rotation of the unit with the rotatable member, the pad is urged inwards towards the axis of rotation by means of centrifugal force generated by the counter-weighting mass.

10 Claims, 5 Drawing Figures

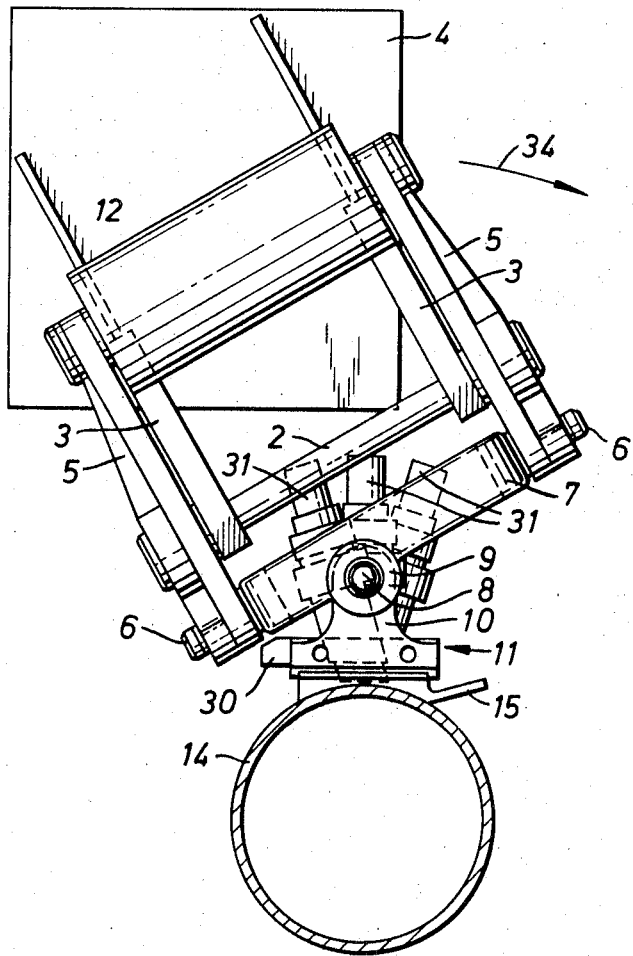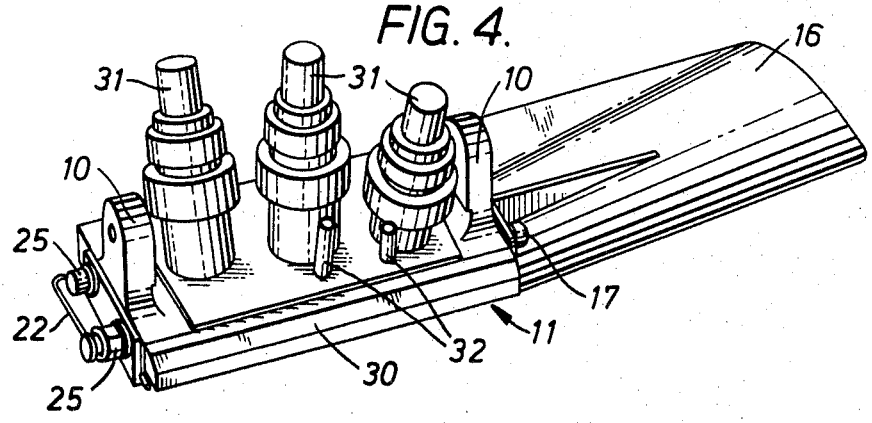

ROTARY ULTRASONIC TESTING APPARATUS

This invention relates to rotary ultrasonic testing apparatus of the kind used in testing steel tubes, for example for defects and dimensional accuracy by rotating an ultrasonic probe unit or a plurality of such units in a close-pitched spiral about each tube, good consistent ultrasonic connection between the probe and the tube often being provided by a liquid directed or disposed between the probe and the tube.

It has previously been proposed to provide one or more probe units on carriers which rotate about the axis of the tube to be tested, and which, upon introduction of the tube into the testing apparatus, are triggered to lower the probe units into engagement with the tube periphery. In practice it is necessary with this apparatus to ensure that the incoming tube is correctly located prior to applying the probe units, so that a significant delay in application of the probe occurs and a portion of the end of the tube is not tested.

It is an object of the present invention to provide probe units which overcome or at least substantially reduce this disadvantage.

According to the invention there is provided a probe unit for use in rotary ultrasonic testing apparatus, comprising a tube engaging probe pad carrying at least one ultrasonic testing transducer probe, the probe pad being mounted at one end of an arm which is provided with a counter weighting mass at the other end thereof, a member rotatable about an axis substantially coincident in use with that of the tube to be tested, the arm being inclined relative to the axis of rotation and being pivotally connected intermediate its ends to the rotatable member for pivotal movement of the pad towards and away from the axis of rotation, whereby upon rotation of the unit with the rotatable member, the pad is urged inwards towards the axis of rotation by means of centrifugal force generated by the counter-weighting mass.

The pivotal axis of the arm may be at right angles to the axis of rotation.

The tube engaging pad may be profiled to the circumferential shape of the tubes to be tested and is preferably provided with an inclined guide shoe on the side thereof facing against the direction of axial movement of the tubes through the testing apparatus whereby upon the tube being fed into the apparatus, the pads are guided into engagement with the periphery of the tube by means of the guide shoe engaging the end of the tube and riding outwardly over it until the pad is able to move onto the tube periphery.

A guide shoe may also be provided on the side of the pad facing in the direction of rotation of the unit around the tube, so the pad is enabled to ride over any tube surface faults such as laminations or protrusions.

The arm may be cranked adjacent its pivot point, the portion of the arm carrying the counter-weight being at a greater angle to the axis of rotation than the portion of the arm carrying the pad.

The pad may be attached to the arm by means of a gimbal arrangement permitting large pivotal freedom of movement of the pad.

A pair of mutually linked arms may be used, the counter-weight being carried between the arms at one end, and the arms being attached to the pad at the other end.

The arm or arms may be inclined to the radius of the tube such that during rotation of the unit about a tube in use, the pad leads and the counter-weight trails relative to the direction of rotation.

Means may be provided for supplying a liquid, such as water, to the pad or the ultrasonic probes to serve as a coupling fluid between the probes and a tube to be tested in operation of the testing apparatus.

In order that the invention may be more readily understood, one embodiment thereof will now be described by way of example with reference to the accompanying drawings in which:

FIG. 2 is an end elevation of the probe unit of FIG. 1;

FIGS. 3 and 4 are perspective views of the probe assembly of the probe unit of FIG. 1.

Figure 1:
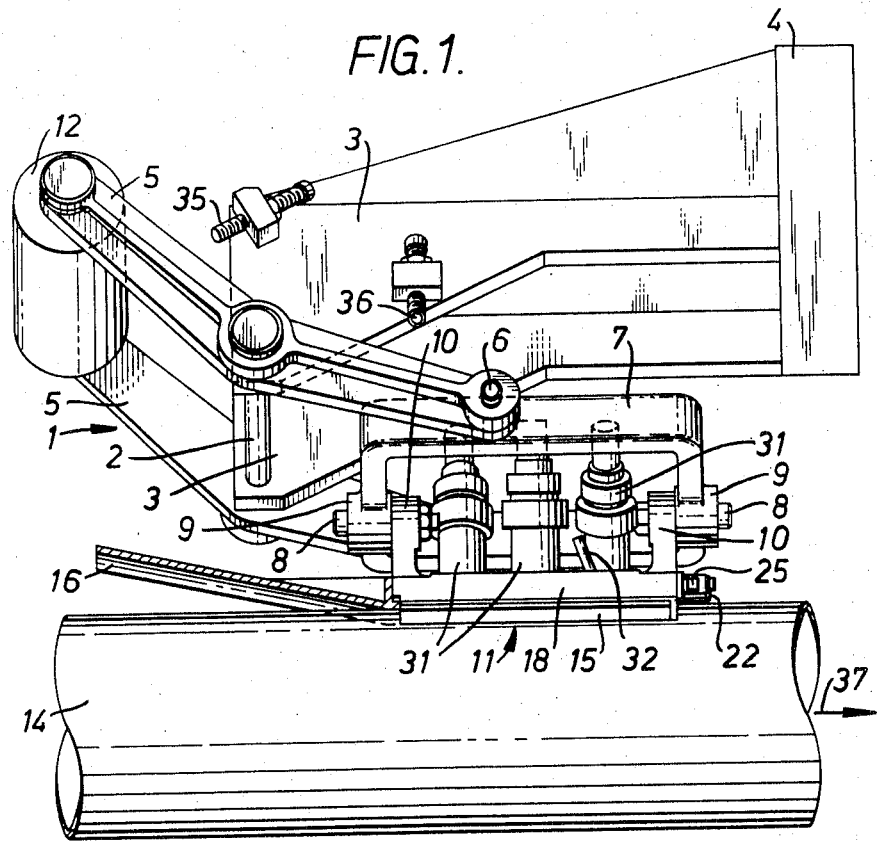
FIG. 1 is a side elevation of a probe unit according to the invention.
Figure 3:
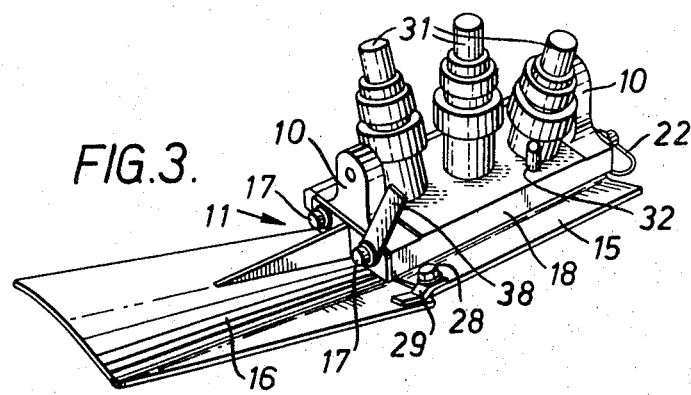
Figure 5:
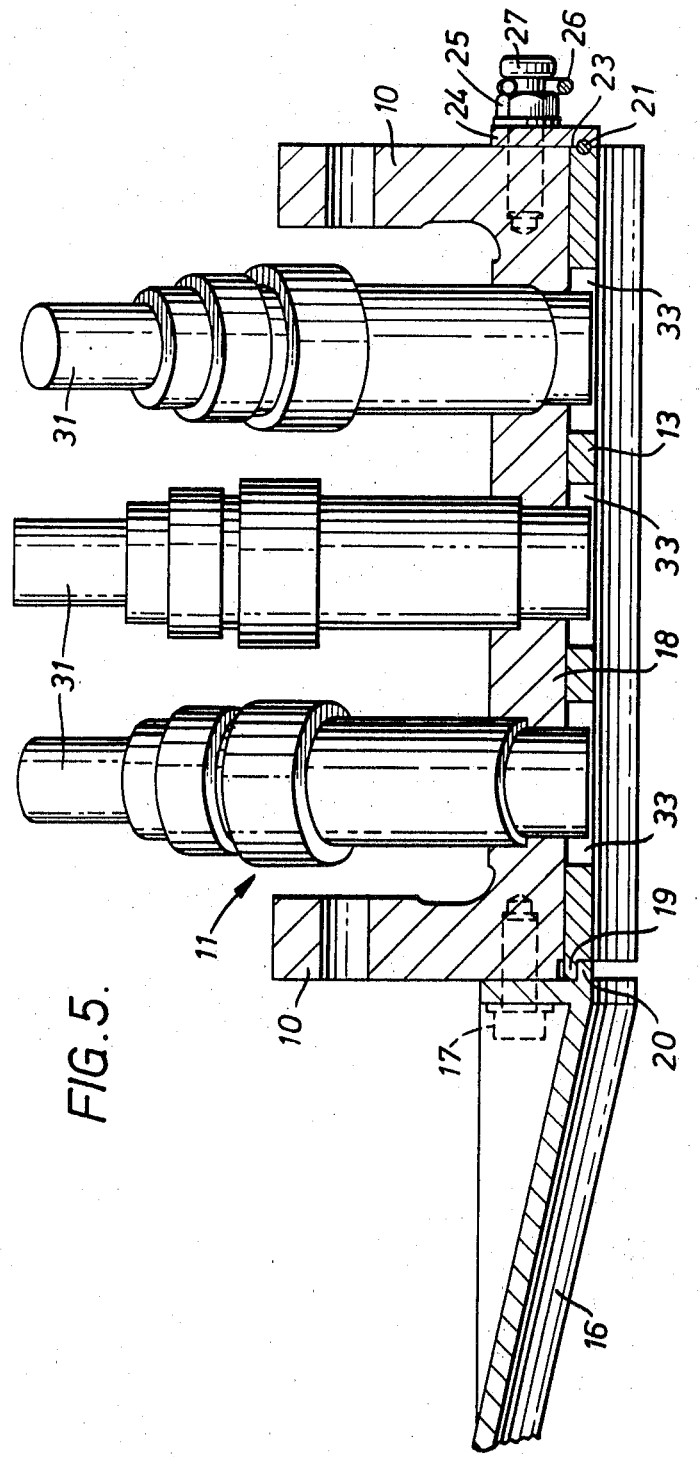
FIG. 5 is part sectional elevation of the probe assembly of the probe unit of FIG. 1.

Considering the drawings, it will be seen that the probe unit includes a pivotted assembly, generally indicated by the reference numeral 1, which is mounted by a pivot pin 2 on bracket arms 3 carried by a rotatable support 4.

The pivotted assembly comprises a pair of cranked arms 5 connected at approximately their mid-points to the pin 2. The arms 5 are pivotally linked at one end by means of pins 6 to opposite sides of a rectangular yoke 7. The yoke 7 is also pivotally linked by means of pins 8 passing through bosses 9 into lugs 10 extending upwardly from a probe pad assembly 11.

The linking arrangements of the arms 5 to the pad assembly 11 through the yoke 7 together form a gimbal support arrangement for the pad assembly enabling the pad assembly to have a large freedom of angular movement.

At the opposite end, the arms 5 are interconnected by a means of a counter-weight 12.

The probe assembly 11 comprises a pad member 18 carrying a base shoe 13 profiled to the shape of the peripheral surface of the tubes to be tested such as 14. Integral with the base shoe 13 is a side guide shoe 15. A front guide shoe 16 is attached to the pad member 18 by means of bolts 17. The integral base shoe 13 and side guide shoe 15 are secured to the pad member 18 by means enabling the quick release and replacement thereof. Thus at one end the base shoe 13 is provided with a lip 19 which is held against the pad member 18 by means of a complementary lip 20 of the front guide shoe. At the other end one arm 21 of a generally "U" shaped spring member 22 engages in complementary grooves in the end 23 of the shoe 13 and a support plate 24 fastened by bolts 25 to the end of the pad member 18, thereby holding the shoe 13 against the pad member 18. The spring member 22 is held in place by locating a hooped end 26 thereof around a stud extension 27 of one of the bolts 25. For additional support and bracing, the side shoe 15 is connected by means of a bolt 28 to a lug 29 extending from the front shoe 16. The base and side shoe can be removed for replacement by undoing the bolt 28, releasing the hoop 26 of the spring 22 from the stud 27 and withdrawing the arm 21 thereof from its grooves, and pivotting the shoe away from the pad member 18 about the lips 19 and 20 until these lips disengage.

An elongate weight 30 is secured to the pad member 18 on the side thereof opposite the side guide shoe 15 to balance the probe assembly 11 as it depends from pins 8.

Three ultrasonic probes 31 are carried by the pad member 18. In addition the pad member is provided with inlet pipes 32 by means of which a ultrasonic coupling liquid (usually water) can be supplied so as to occupy, in operation, spaces 33 between the probes 31 and the probe 14 to be tested.

In operation, the unit, complete with brackets 3 and support 4, is arranged to rotate in the direction indicated by the arrow 34 in FIG. 2 about the axis of the tube 14. The consequential centrifugal force exerted by the weight 12 is higher than that exerted by the probe assembly 11 so that the probe assembly is urged about the pivot pin 2 towards the tube axis to a position just within the radius of the tube to be tested (e.g., between ¼ inch to ¾ inch less than the tube radius). It is restrained in this position by means of an adjustable stop 35 mounted on one of the brackets 3. (A further adjustable stop 36 is provided to restrict outward movement of the probe assembly 11.)

As the tube to be tested 14, is fed into the testing apparatus in the direction of the arrow 37 in FIG. 1, its leading edge first encounters the front guide shoe 16 which "rides up" the tube edge until the surface of the base shoe 13 is able to engage with and run over the outer periphery of the tube, the pad being held in engagement with the tube by centrifugal force.

It is to be noted that testing of the tube can commence immediately the pad assembly 11 engages at the extreme end of the periphery of the tube 14, so that all of the tube can be ultrasonically tested, including the end most portion.

The angle of inclination of the portion of the arms 5 between pins 2 and 6 relative to the axis of the tube 17 is maintained as small as practically possible so as to reduce axial displacement of the probe assembly 11 should, for example, an eccentric or oval tube be tested. Such axial displacement would change the spiral scanning pattern of tube testing and possibly introduce error.

The side guide shoe 15 is provided to protect the pad assembly against damage from laminations, protrusions and similar tube surface faults. Thus, if the pad assembly encounters any such fault during rotation, the guide shoe 15 will guide the assembly over it. Similarly, the unit is inclined to the tube axis at an angle (about 30° in practice) to assist the probe assembly ride over any such tube surface fault.

Pivotal movement of the probe assembly 11 relative to the yoke 7 is restricted by a stop member 38.

The support 4 may be arranged such that its radial position relative to the rotational axis can be changed, thereby enabling the apparatus to accommodate tubes of varying diameters. The probe assembly can be replaceable for the same purpose.

We claim:

1. Rotary ultrasonic tube testing apparatus incorporating a probe unit located at the input end of the apparatus, said probe unit comprising: an arm; a tube engaging probe pad carrying at least one ultrasonic testing transducer probe and being mounted at one end of said arm; a counter-weighting mass at the other end of the arm; and a member rotatable about an axis substantially coincident in use with that of the tube to be tested, the arm being inclined relative to the axis of rotation and being pivotally connected intermediate its ends to the rotatable member for pivotal movement of the pad towards and away from the axis of rotation, whereby upon rotation of the unit with the rotatable member, the pad is urged inwards towards the axis of rotation by means of centrifugal force generated by the counter-weighting mass so as immediately to engage an incoming tube for testing.

2. Apparatus as claimed in claim 1 wherein the probe pad trails behind the counter weight relative to the direction of axial movement in use of the tube to be tested.

3. Apparatus as claimed in claim 1 wherein the pivotal axis of the arm is at right angles to the axis of rotation of the rotatable member.

4. Apparatus as claimed in claim 1 wherein the arm is cranked adjacent its pivot point, the portion of the arm carrying the counter weight being at a greater angle to the axis of rotation than the portion of the arm carrying the pad.

5. Apparatus as claimed in claim 1 wherein said arm comprises a mutually linked pair of said arms, the counter weight being carried between the arms at one end, and the arms being attached to the pad at the other end.

6. Apparatus as claimed in claim 1 wherein the arm is inclined to the radius of the tube such that during rotation of the unit about a tube in use, the pad leads and the counter weight trails relative to the direction of rotation.

7. Apparatus as claimed in claim 1 wherein the pad is attached to the arm by means of a gimbal arrangement permitting large pivotal freedom of movement of the pad.

8. Apparatus as claimed in claim 1 in which a plurality of said ultrasonic testing transducer probes are carried by said probe pad.

9. Apparatus as claimed in claim 1 wherein the probe pad is provided with an inclined guide shoe on the side thereof facing against the direction of axial movement of tubes through the testing apparatus, whereby upon the tube being fed into the apparatus, the pads are guided into engagement with the periphery of the tube by means of the guide shoe engaging the end of the tube and riding radially outwardly over it until the pad is able to move on to the tube periphery.

10. Apparatus as claimed in claim 1 wherein the probe pad is provided with a guide shoe on the side thereof facing in the direction of rotation of the pad around the tube.

* * * * *